United States Patent

[11] 3,573,812

[72] Inventor George E. Pihl
  Abington, Mass.
[21] Appl. No. 680,668
[22] Filed Nov. 6, 1967
[45] Patented Apr. 6, 1971
[73] Assignee Miniature Electronics Components Corp.
  Holbrook, Mass.

[54] ELECTROMAGNETIC INDICATOR
  11 Claims, 8 Drawing Figs.
[52] U.S. Cl. .................................................. 340/373,
  335/125, 340/375, 340/378
[51] Int. Cl. ...................................................... G08b 5/22
[50] Field of Search ......................................... 340/373,
  375, 378; 335/125, 128, 268

[56] References Cited
UNITED STATES PATENTS
3,014,208 12/1961 Peterson, Jr. ................ 340/373X
3,335,376 8/1967 Martin ......................... 335/125

Primary Examiner—Donald J. Yusko
Assistant Examiner—Michael Slobasky
Attorney—Pennie, Edmonds, Morton, Taylor and Adams ABSTRACT: A two-state electromagnetically actuated indicator providing in each state a display that is magnetically latched, regardless of the removal or reapplication of voltage, until a proper reset signal is applied. The illustrated embodiment also features internal switching for controlling associated equipment or for switching the electromagnet unit so that drive energy is required only during display transition.

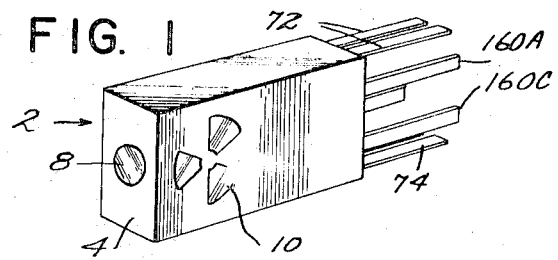
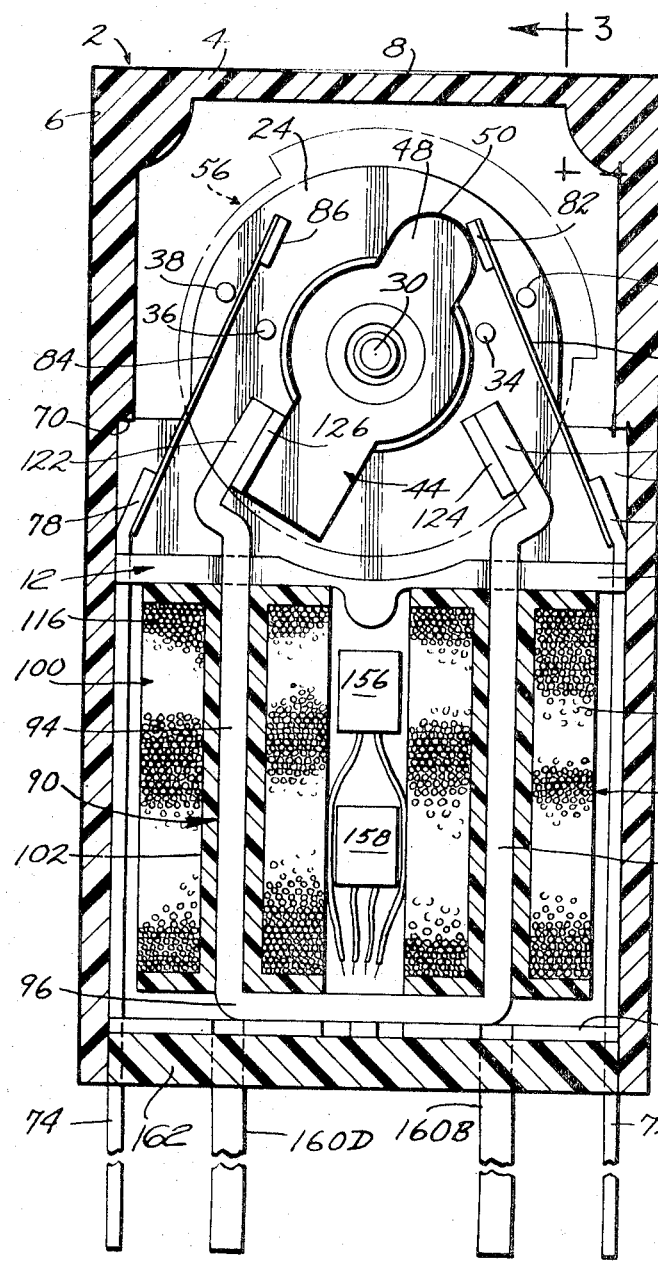
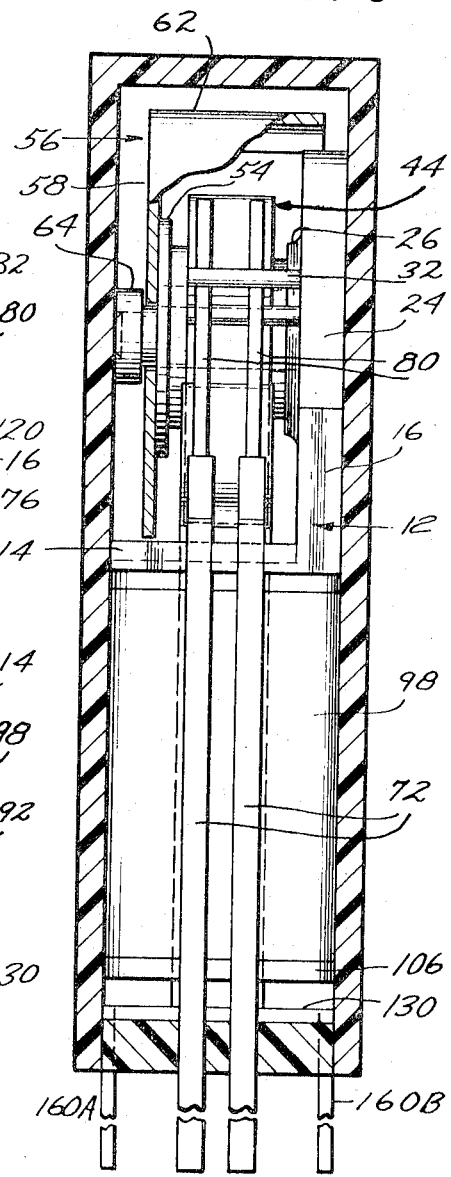
INVENTOR.
GEORGE E. PIHL
BY
Nicholas A. Pondisceo
ATTORNEY

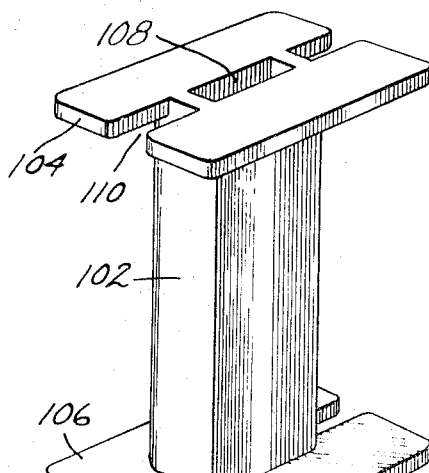
FIG. 4
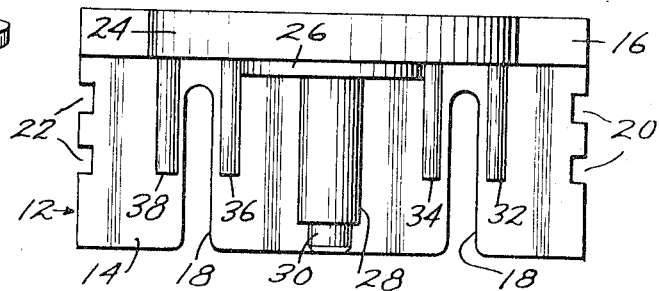
FIG. 5
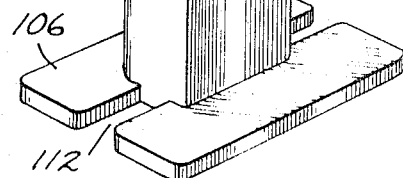
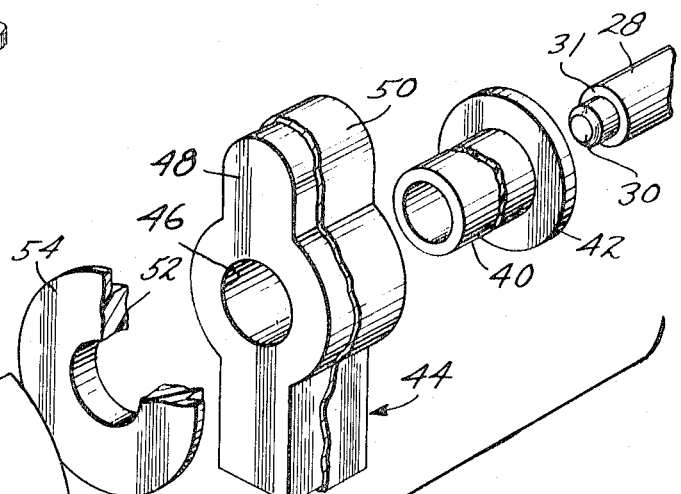
FIG. 6
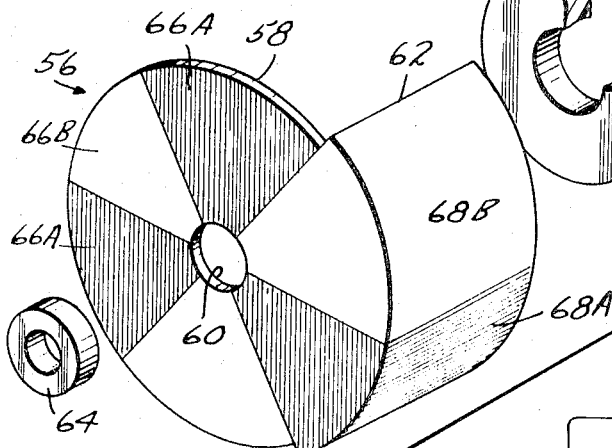
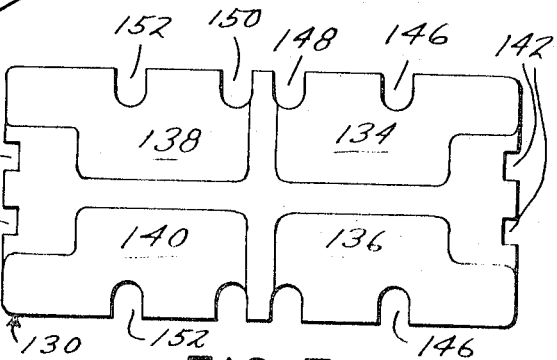
FIG. 7
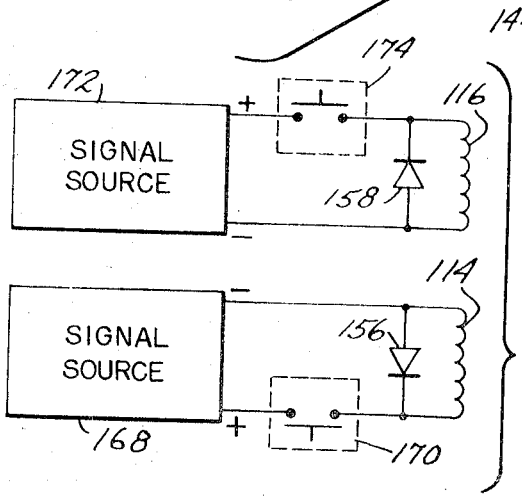
FIG. 8
INVENTOR.
GEORGE E. PIHL
BY
Nicholas A. Pendisio
ATTORNEY 3,573,812

ELECTROMAGNETIC INDICATOR

This invention relates to two-state electromagnetic indicating devices which may be mounted for viewing on a supporting panel for the purpose of indicating conditions such as mechanical or electrical failure in equipment such as aircraft, space vehicles, and electronic systems and the like.

PRIOR ART

A wide variety of electromagnetic indicators are known in the art. These indicators usually employ a moveable indicator member and an electromagnetic assembly adapted to cause the indicator member to move into predetermined display positions. Typical of the patents known to persons skilled in the art are: (a) U.S. Pat. No. 2,245,493, issued Jun. 10, 1941 to E. Nothe for "Electrical Indicating Means," (b) U.S. Pat. No. 3,306,300 issued May 22, 1962, to J. R. Knight for "Electromagnetic Display Device," and (c) U. S. Pat. No. 3,074,060 issued Jan. 15, 1963, to L. Kadlec for "Indicator Employing Torsion Bar Support." The indicators disclosed by these patents, like the indicator embodying the present invention, employ a selectively moveable indicator member which presents one display in one position or state and a contrasting display in another position or state, with the displays adapted to be visible in ambient light without the use of lamps. Further features old in the art are self-detenting or latching of the indicator member and provision of internal switching such that drive energy is required only during display transition. Indicators of this type used to monitor electrical conditions such as the presence or absence of electrical signals have several primary requirements, including high stability under shock and vibrations, adequate hermetic sealing to protect against dust, moisture, etc., low power, small size and rapid response. These problems have all been dealt with but have not been effectively eliminated. A particularly troublesome limitation of the prior art is poor internal switching, especially with respect to contact design and wear.

SUMMARY OF THE INVENTION

It is an object of the present invention to provide an improved indicating device of the type described.

It is another object of this invention to provide a novel and reliable indicating device which is vibration stable and wherein each limit position is positively maintained until a proper reset signal is applied.

A further object of the invention is to provide an improved electromagnetic indicator with internal switching that is simple and provides reliable operation under vibration and shock.

A more specific object of the invention is to provide an electromagnetic indicator constructed with improved internal switching adapted to render its electromagnetic assembly self pulsing from a constant DC source such as a battery, thereby eliminating the need for a pulse generator.

A further specific object of the invention is to provide an improved electromagnetic indicator of the type described that comprises a novel switch adapted to be closed when the indicator member moves to a first position and to reopen when the indicator member moves to a second position, the switch being connected so that when it is closed it enables the electromagnet to be energized to cause a predetermined display transition.

Still another specific object of the invention is to provide an electromagnetic indicator comprising improved internal switching means adapted to be connected so as to control energization of the power circuit for the indicator or to control externally connected equipment.

These and other objects of the invention are achieved by a construction comprising an electromagnet having a core that provides two apaced pole pieces, a permanent magnet mounted for rotation on a predetermined axis that is disposed so that the pole pieces determine two limit positions for the magnet, and two pairs of switch contacts disposed so that one pair of contacts is closed by the magnet when the magnet is in one limit position and the other pair of switch contacts is closed by the magnet when the magnet is in its other limit position. The contacts of each pair are disposed so that they are engaged by the magnet before it reaches a given limit position and tend to remain in engagement with the magnet for a limited period of time as it is rotated away from the given limit position. The magnet forms part of a rotatable indicator assembly. It is rotated from one to the other of its limit positions by energizing the electromagnet so that the permanent magnet is repelled by the field concentrated at the nearest pole piece and is attracted by the field concentrated at the other pole piece. Each pole piece is provided with nonmagnetic means designed to maintain a gap between it and the magnet when the latter is in the limit position determined by the pole piece. The contacts are spring members adapted to move toward the magnet under the influence of its field. This movement provides a wiping action which maintains the contacts clean and also allows them to remain in engagement with the magnet long enough for the magnet to move away from the influence of the field of the pole piece which determined its previous limit position.

Other objects, features and advantages of the invention are presented by the following detailed description which is to be considered together with the accompanying drawings, wherein:

FIG. 1 is a perspective view of an indicator embodying a preferred form of the invention;

FIG. 2 is a sectional view in elevation of the indicator of FIG. 1, with the indicator member shown in phantom;

FIG. 3 is a sectional view in elevation taken substantially along line 3–3 of FIG. 2;

FIG. 4 is a perspective view of one of the bobbins employed in constructing the electromagnet;

FIG. 5 is a plan view of the platform for supporting the rotatable indicator assembly;

FIG. 6 is an exploded perspective view of the rotatable indicator assembly and the shaft on which the magnet is supported;

FIG. 7 is a bottom view of a printed circuit tabbing board used to provide terminal connections for the indicator; and FIG. 8 is a schematic diagram of one form of circuit that may be employed in operating the indicator.

Referring now to FIG. 1, the preferred embodiment of the device comprises a housing 2 of rectangular cross section that is made of a clear transparent plastic such as the carbonate polymeric material sold by General Electric Co. of Schenectady, New York under the trademark LEXAN . The housing 2 is formed with one end wall 4, the opposite end being open in order to receive the operating components hereinafter described. The exterior surface of the housing is painted or coated with an opaque insulating material 6 (see FIGS. 2 and 3) which entirely covers the exterior surface of the case except for a circular area 8 in the end wall 4 and three circular segment areas 10 in one sidewall. The coating 6 may be black or red or any other color that provides a visual contrast with respect to the clear portions 8 and 10 which function as indicator windows.

Referring now to FIGS. 2 and 3, the indicator includes a platform member 12 formed of a suitable plastic material, e.g. nylon. As seen in FIGS. 2, 3, and 5 the platform 12 comprises a base 14 formed integral with a wall 16, the base and wall being at right angles to each other. The base 14 consists of two elongated slots 18 extending inwardly from the edge opposite wall 16. The base 14 also includes two pairs of relatively short rectangular slots 20 and 22 formed in its opposite end edges. The wall portion 16 is formed with an extension 24 whose periphery has a circular curvature. This extension 24 of wall 16 is formed with circular projection 26 which is concentric with a post 28 that is formed integral therewith and extends parallel to the plane of base 14. The post 28 has a reduced diameter portion 30 at its free end. The extension 26 of wall 16 also includes four spaced pins 32, 34, 36 and 38, with pins 32 and 34 disposed on one side and pins 36 and 38 disposed on the opposite side of post 28. The four pins all extend parallel to post 28, with pins 32 and 38 located in a first plane and pins 34 and 36 located in a second plane, both parallel to the plane of base 14.

Rotatably mounted on post 28 is a bushing 40 having a peripheral flange 42 at one end. Bushing 40 is made of a suitable insulating material, e.g. Teflon. Flange 42 slidably engages the lateral projection 26 which functions as a shoulder. Mounted on bushing 40 is an elongate permanent magnet 44 which is spaced from the lateral projection 26 by the bushing's flange 42. The magnet 44 comprises an elongate bar that is polarized axially so that its north and south poles are at its opposite ends. The center section of the magnet 44 has a hole 46 and is enlarged as shown so as to provide sufficient wall thickness around the hole. The hole 46 is sized so as to make a tight locking fit with the bushing 40. The opposite ends of magnet 44 have an essentially rectangular cross section, with one end (the upper end in FIGS. 1 and 6) rounded off as shown at 48. The whole magnet is further coated with a thin layer 50 of conductive metal, e.g. gold or a gold alloy (the conductive metal layer is shown partially broken away in FIG. 6). Also mounted on bushing 40 is a spacer sleeve 52 having a flange 54. This part may be made of plastic but preferably is made of anodized aluminum. Sleeve 50 is cemented to magnet 44 and preferably also to bushing 40.

Attached to the flange 54 of spacer sleeve 52 is an indicator member 56. The indicator member 56 consists of a circular disc 58 having a central opening 60 that is slightly larger than post 28. The disc 58 has a constant radius throughout about 240° of its circumference. For the remaining 120° the disc has a slightly greater radius and is formed with a flange 62 at its periphery. The flange 62 forms approximately a one-third section of a cylinder. The disc 58 is preferably cemented to the adjacent flange 54 of spacer sleeve 52. As an alternative measure, the indicator member may be secured to the flange 54 by screws or other suitable fastening means. The reduced diameter portion 30 of post 28 projects beyond disc 58 and fits in a small Teflon sleeve spacer 64. One end of the latter engages the shoulder 31 (see FIG. 6) in post 28 while the other end engages the adjacent sidewall of the case in the area between the inner ends of the window segments 10. Bearing 64 thus limits axial movement of the indicator member 56 in a direction away from the wall 16 of platform 12.

The outer surface of the disc 58 is divided into six equal segments, with three alternately occurring segments 66A painted the same color as the exterior of the case and the other segments 66B painted white or some other contrasting color, e.g. yellow. The flange 62 is divided into two sections, one section 68A colored the same as the segments 66A and the other segment 68B colored the same as the segments 66B. As shown in FIG. 6, the segments 68A and 68B are aligned with one of the segments 66A and 66B respectively.

It is believed to be obvious from the foregoing discussion that bushing 40, magnet 44, spacer 52 and indicator member 56 constitute a unitary rotor assembly that is rotatably supported by post 28. The magnet and indicator member are oriented so that the magnet's rounded end 48 and the flange 62 of the indicator member are located between post 28 and the end wall 4 of the case. Further more the disc 58 lies against the adjacent sidewall of the case that has the window segments 10. With this arrangement segments 66A, 66B are disposed so as to rotate into and out of alignment with windows 10 and the segments 68A, B, are disposed so as to move into and out of alignment with window 8. The position of platform 12 within the case is determined by engagement of the wall 16 with shoulders 70 formed in the inner surfaces of the narrow sidewalls of the case. The platform may be cemented to the case, but preferably it is held against shoulders 70 by the electromagnet assembly and the printed circuit tabbing board which are described below.

Referring now to FIGS. 2 and 3, the indicator further includes two pairs of flat terminal strips 72 and 74 which extend up alongside the inner surface of the narrow sidewalls of the case and reside in the pairs of slots 20 and 22 respectively. These strips preferably are cemented to the platform prior to insertion of the platform in the case. The inner ends of terminal strips 72 and 74 are bent inwardly as shown at 76 and 78. Attached to the bent ends 76 of the strips 72 are two leaf spring members 80 made of a resilient conductive metal alloy. These leaf springs 80 extend up between the pins 32 and 34 and their upper ends are provided with small flat contact pads 82 made of a magnetic alloy and plated with an electrically conductive metal. By way of example, the contact pads 82 may be made of a nickel-iron alloy and coated with gold. The bent ends 78 of the two terminal strips 74 carry identical leaf spring members 84 fitted with identical contact pads 86. The leaf spring members 84 extend between the pins 36 and 38. The upper ends 76 and 78 of the flat terminal strips are bent at an angle such that, in the absence of any applied bending force, the leaf spring members 80 and 84 are disengaged from the pins between which they extend but are closer to pins 32 and 38 than they are to pins 34 and 36. Additionally the leaf spring members 80 and 84 extend up far enough for their contact pads 82 and 86 to be engaged by the rounded end of magnet 44 when the latter rotates toward them.

The electromagnetic subassembly of the device comprises a U-shaped soft iron core 90 consisting of two parallel legs 92 and 94 connected together by a horizontal base section 96, and also two coil assemblies 98 and 100 mounted on legs 92 and 94 respectively. Each coil assembly comprises a bobbin (see FIG. 4) consisting of a body 102 of rectangular cross section and opposite end flanges 104 and 106. The body 102 of the bobbin has an axially extending hole 108 of rectangular cross section sized to receive one of the legs of the core 90. Each of the flanges 104 and 106 is provided with slots 110 and 112 at opposite sides thereof. Wound about the two bobbins are wire coils 114 and 116. The ends of these coils are brought out to the open end of the case via the slots 110 and 112, depending upon which flange of the bobbin is nearest to the open end of the case. In this connection it is to be noted that only one of the flanges 104 and 106 is required to be slotted, but both flanges are slotted so that in the course of assembling the device it is immaterial as to which end of the bobbin is inserted first into the case.

As initially formed the legs 92 and 94 of the core are straight from one end to the other so as to permit the bobbins to be inserted thereon. Once the bobbins have been mounted on the core, the free ends of the legs 92 and 94 are bent twice so as to provide offset end portions 120 and 122 that function as pole pieces.

The legs 92 and 94 extend through the slots 18 in the base 14 of platform member 12, with the pole pieces disposed so as to limit rotation of magnet 44. The pole pieces 120 and 122 extend at predetermined angles, substantially parallel to the spring members 80 and 84 respectively when the latter are not deflected by the magnet 44. The confronting inner surfaces of the two pole pieces are provided with thin flat nonmagnetic electrically insulating bumpers 124 and 126 substantially as shown in FIG. 2. One limit position of the magnet is determined by its engagement with the bumper 124 and the other limit position is determined by its engagement with bumper 126. The bumpers serve to provide a magnetic gap between the magnet and the pole pieces in the two limit positions.

The electromagnet assembly is held in place by a printed circuit tabbing board identified generally at 130. The tabbing board is of rectangular shape and is provided on its underside with four conductive lands 134, 136, 138 and 140. These conductive lands are preferably made of copper or some other conductive metal or metal alloy, while the board itself is made of a suitable plastic, e.g. an epoxy resin, reinforced with fiberglass. The tabbing board has two pairs of slots 142 and 144 formed in the edges of its two shorter sides. Each of the longer edges of the board is provided with four slots 146, 148, 150 and 152. The slots 146 and 148 on one edge are common to land 134 while the corresponding slots on the opposite edge are common to land 136. In the same manner the other slots 150 and 152 are common to lands 138 and 140. The slots 142 accommodate the flat terminal strips 72 while slots 144 accommodate the two flat terminal strips 74. The slots 146 permit the ends of the coil of coil assembly 98 to be brought out to the lands 134 and 136. The slots 152 serve the same purpose with respect to coil assembly 100. The remaining slots 148 and 150 allow the leads of two microsize diodes 156 and 158 disposed in the space between the two coil assemblies to be brought out and connected to the lands 134—140. It is to be noted that use of the two diodes is optional and they are used with pulse inputs to prevent high voltage from being produced due to inductance of the coils when coil excitation is removed. The exact circuit arrangement for the coils, the diodes and the terminal strips 72 and 74 depends on the use to which the indicator is put.

After tabbing board is inserted and the appropriate connections made for the two coils and diodes, four output terminals 160A–D are soldered to the four conductive lands 134—140 respectively. If the switch contacts 82 and 86 are to be connected into the energizing circuits for the coils, then jumper leads are soldered between the terminal strips 72 and 74 and the lands. Such jumper leads are not required if the switch contacts are not connected in the energizing circuits for the two coils but are used for switching associated circuitry. The tabbing board and the terminals are held in place by a potting compound 162 which is made flush with the end of the case substantially as shown in FIG. 2.

It is to be noted that the leaf spring members 80 and 84 are so arranged with respect to the magnet that when the latter is stopped in a limit position, its rounded end 48 exerts substantially no flexing or bending pressure on the leaf spring members which support the contacts 82 and 86 closed by the magnet, with the result that the spring members 80 and 84 do not engage any of the pins 32—38. The latter serve merely to limit oscillation of the spring members after the magnet has pulled away from bridging engagement with the contact pads. Hence in each limit position of the magnet, both pairs of spring members 80 and 84 are free of stress and the magnetic switch contacts provide contact pressure without spring deflection. This avoids a tendency to unlatch.

As indicated above, the operating circuits for the indicator may take several forms. One suitable operating circuit is illustrated in FIG. 8.

The circuit of FIG. 8 is employed when the indicator is to be self-switching. Terminal 160A which is connected to one end of coil 114 is coupled to one side of an input signal source 168 by way of the terminal strips 74 and a switch 170 which comprises the two contact pads 86 and the conductive surface 50 of magnet 44. The other end of coil 114 is connected by terminal 160B to the other side of input signal source 168. The diode 156 is coupled across the coil (by connections to lands 134 and 136) so as to be back biased by the input signal. This allows the diode to absorb the inductive voltage produced when switch 170 is opened while the coil is energized. The circuit for coil 116 is essentially the same as that described above, except that it is connected to a second signal source 172 by terminals 160C and 160D via terminal strips 72 and a switch 174 which comprises the two contact pads 82 and the conductive surface 50 of magnet 44. The microdiode is connected across coil 116 so as to be back biased by the input signal. As indicated above the magnet has salient poles located at its opposite ends. It is immaterial as to which pole is at which end. For the purpose of this discussion of FIG. 8, let it be assumed that the lower end of the magnet as seen in FIG. 2 is the south pole, in which case each coil is wound so that when energized it provides a magnetic field which causes the pole piece on the leg which it surrounds to assume a south magnetic polarity and the other pole piece to assume a north magnetic polarity. Thus, energizing coil 114 causes pole piece 120 to become a south pole and pole piece 122 to become a north pole. Accordingly operation of the indicator connected as shown in FIG. 8 is as follows: With both coils deenergized and the magnet in the limit position shown in FIG. 2, a "white" readout is obtained at windows 8 and 10 and the switch 174 is closed by virtue of the contact pads 82 being bridged by the conductive surface of the magnet. Furthermore the magnet is latched to pole piece 122. Assume now that an input signal is supplied by signal source 172. Because switch 174 is closed, coil 116 will be energized. Pole piece 122 immediately becomes a south magnetic pole, with the result that the magnet is repelled and starts to rotate counterclockwise as seen in FIG. 2. As the magnet begins to rotate the contact pads 82 follow the magnet. They do so unimpeded until the leaf springs engage pin 34, at which point they try to continue following the magnet but cannot. The magnet moves out of engagement with contact pads 82 just about the time that its bottom end nears the midpoint between the two pole pieces so that as coil 116 is deenergized by opening of contacts 82, the magnet has sufficient momentum to rotate far enough for its position to be determined by its attraction to pole piece 120. The magnet automatically latches to pole piece 120 whose bumper 124 determines its new limit position. In this second limit position a "black" or "red" readout is obtained at windows 8 and 10. It is to be noted that as the upper end of the magnet approaches the contact pads 86, the latter are attracted to it and engage the magnet before it is stopped by bumper 124. This magnetic attraction prevents the contacts from chattering with respect to the magnet so that once the contact pads 86 are bridged, switch 170 is closed and will remain closed until the magnet is repelled back to its original position by energization of coil 114 (closing of switch 170 effectively enables the energizing circuit of coil 114 so that it may be energized by a subsequent signal from source 168). The occurrence of an input signal from source 168 will cause the magnet to return to its first limit position so that the "white" readout is restored.

The signal sources 168 and 172 may be adapted to provide discrete input pulses of finite width or else a substantially steady state DC voltage, with the application of the input signal being determined or caused by some external occurrence, e.g., the closing of a thermostat or a limit switch in associated equipment. It is to be noted that in fact the two signal sources 168 and 172 may comprise a single source with means for switching the source from one coil to another. Such source switching means may take the form of a relay. Alternately the source may be a flip-flop with the output from one side of the flip-flop applied to coil 114 and the output from the other side of the flip-flop applied to coil 116.

It also is to be appreciated that the dual circuit of FIG. 8 is only one of several ways of controlling operation of the indicator. For one thing, the coils may be connected directly to the signal sources 168 and 172 by way of the terminals 160A–D, leaving the switches 170 and 174 for connection by terminal strips 72 and 74 to other equipment whose operation is initiated or terminated by opening or closing of the switches. Furthermore, where the magnet operated switches 170 and 174 are not connected to the coils, it is possible (a) to energize both coils simultaneously with signals of opposite polarity, in which case the two pole pieces will exert a push-pull, i.e. repel-attract, influence on the lower end of the magnet, or (b) to connect the coils in series but wound so that opposite magnetic poles are induced in the two pole pieces. In the latter case input signals of one polarity are used to cause movement of the magnet in one direction and signals of opposite polarity are used to cause reverse movement of the magnet. It also is to be understood that one of the terminals 160 can be used as a common terminal for both coils. Still other well-known circuit arrangements may be employed with indicators embodying this invention.

Indicators constructed in accordance with this invention have a number of advantages. For one thing magnetic latching is provided for both limit positions of the indicator member. Another important feature is use of two coils which make possible a variety of control circuit arrangements as above described. A third advantage is derived from the fact that the magnetic attraction between the magnet and the switch contacts causes the switch contacts to close before the magnet reaches it appropriate limit position and remain closed for a limited time after the magnet starts to move toward its other limit position. In essence the closed contacts are dragged by the magnet for a sufficient distance to go beyond the midpoint of its stroke to its other limit position. This not only provides better control over energization of the coils when connected as shown in FIG. 8 but also (due to the angular movement of the magnet) provides a wiping action on the contact pads that keeps them clean and causes them to wear evenly. Furthermore the magnetic attraction between the magnet and the contact pads prevents the switches from opening under shock or vibration. Another important feature is the lack of stress on the resilient leaf spring members 80 and 84 when the magnet is stopped in engagement with the contact pads. Improved contact latching is achieved because the contact pressure is produced magnetically rather than by spring deflection. Still another significant feature resides in the fact that the base 14 of the platform member 12 serves as a partition to seal off the rotor assembly and the switch contacts from the electromagnet assembly, so that any corrosive gases given off as a result of heating of the coil assembly or the potting compound are prevented from causing deterioration of the contacts. In this connection it is to be noted that the legs of the core substantially fill the slots 18 and that any open space in the slots can be filled with a potting compound of the type that does not contain any volatile constituents. It also is believed obvious that indicators constructed as above described are easily assembled and that different subassemblies can be tested at least in part before final assembly of the indicator.

A further important feature of the design herein described and illustrated is that the entire unit consisting of the rotor and electromagnet assemblies and the tabbing board can be vacuum baked to effect removal of volatile constituents prior to being inserted into the case. In this same design the area of the final seal between the tabbing board and the case is a minimum since the board is shaped and sized to just fit in the case. It is to be understood that the term "volatile constituents" embraces not only gases such as oxygen and hydrogen, but also other relatively low and medium boiling point materials, e.g. solvents or plasticizers present in the case or other plastic parts, that may vaporize when the unit is heated and then deposit out on the switch contacts or other parts when the unit is cooled. With respect to the switch contacts, the large wiping action that keeps them clean during normal operation is utilized to remove any contaminants deposited or formed thereon (which may occur during final sealing of the case) before shipment to the customer. The contacts are self-cleaned by deliberately pulsing the unit a sufficient number of times, e.g. 2—3 thousand times, for the contaminating layer to be removed by the wiping action described above.

It is to be understood that the invention is not limited in its application to the details of construction and arrangements of parts specifically described or illustrated, and that within the scope of the appended claims, it may be practiced otherwise than as specifically described or illustrated.

I claim:

1. In combination a two-state electromagnetic indicator and a switch which is closed in one of said states and open in the other of said states; said indicator comprising a permanent magnet mounted for rotation, said magnet being polarized radially of its axis of rotation, an indicator member mounted for rotation with said magnet, said member adapted to indicate one state when said magnet is rotated to one position and the other state when said magnet is rotated to a second position, and electromagnetic means operative to move said magnet from one to the other of said positions; said switch comprising an electrically conductive surface on said magnet and a pair of spaced electrical contact members disposed so as to be engaged and bridged by said conductive surface when said magnet is in said one position and spaced from said conductive surface when said magnet is in said other position, and means supporting each of said contact members, said supporting means including terminals for connecting said contact members to an electrical circuit.

2. The combination of claim 1 wherein said supporting means are resilient and are disposed so as to permit said contact members to move with said magnet through a limited distance as it moves toward or away from said first position.

3. The combination of claim 2 wherein a portion of each of said contact members comprises a magnetic material.

4. A two-state electromagnetic indicator adapted to provide switching in each of its states, said indicator comprising a rotor assembly that includes a permanent magnet and an indicator member, means supporting said rotor assembly for rotational movement between first and second predetermined limit positions, said indicator member adapted to indicate one state in said first limit position and a second state in said second limit position, electromagnetic means energizeable to magnetically influence said magnet to rotate said rotor assembly from one to the other of said limit positions, a first normally open switch comprising contacts adapted to be closed by said magnet when said rotor assembly is in said first limit position, and a second normally open switch comprising contacts adapted to be closed by said magnet when said rotor assembly is in said second position.

5. A two-state electromagnetic indicator as defined by claim 4 wherein said electromagnetic means comprises a magnetic core and electrically energizeable means for inducing a magnetic field of selected polarity in said core, and further wherein the ends of said core determine said limit positions.

6. A two-state electromagnetic indicator as defined by claim 5 wherein the ends of said core are positioned to intercept one end of said magnet.

7. A two-state indicator as defined by claim 4 wherein said electromagnetic means comprises a magnetic core and a pair of coils, said core comprising two parallel legs and a base connecting said legs, said coils each disposed in surrounding relation with a different leg of said core, and terminal means for selectively energizing said coils, said coils arranged so that application of an input signal of given polarity to the terminal means of one coil induces a first magnetic field in said core and application of an input signal of the same polarity to the terminal means of the other coil induces in said core a second magnetic field that is opposite to said first magnetic field, said legs disposed so that (a) said magnet is magnetically latched to one leg in said first limit position and magnetically latched to the other leg in said second limit position and (b) said first magnetic field will repel said magnet away from said one leg toward said other leg and said second magnetic field will repel said magnet away from said other leg toward said one leg.

8. An electromagnetic indicator comprising a magnetic core presenting two spaced pole pieces, a magnet with a north magnetic pole at one end and a south magnetic pole at its opposite end, means rotatably supporting said magnet for rotation on an axis located between its ends, said magnet being rotatable in either direction so that one of its ends can swing into and out of magnetic latching relation with each of said pole pieces, at least a portion of said magnet having an electrically conductive surface, first and second pairs of electrical contact members, said first pair of electrical contact members disposed so as to be engaged and bridged by the conductive surface of said magnet when said magnet is latched to one of said pole pieces, said second pair of contact members disposed so as to be engaged and bridged by the conductive surface of said magnet when said magnet is latched to the other of said pole pieces, and electrically energizeable means adapted to selectively induce first and second magnetic fields of opposite polarity in said core so that one field will force said magnet out of latching relation with said one pole piece and rotate it into latching relation with the other pole piece and the other field will force said magnet out of latching relation with said other pole piece and rotate it into latching relation with said one pole piece, said electrically energizeable means comprising an energizing circuit that includes said first and second pairs of contact members arranged so that said first field is produced only when said first pair of contact members is bridged by said conductive surface and said second field is produced only when said second pair of contact members is bridged by said conductive surface.

9. An indicator as defined by claim 8 wherein said contact members comprise magnetic material and are resiliently mounted so that engagement and disengagement thereof by said magnet is affected by the magnetic attraction of said magnetic material to said magnet.

10. An electromagnetic indicator as defined by claim 8 wherein said energizeable means comprises a first coil arranged to induce said first field and a second coil arranged to induce said second field, and further wherein said first and second pairs of contact members are connected in series with said first and second coils respectively.

11. An electromagnetic indicator comprising a hollow case formed with one end open, a permanent magnet, means rotatably supporting said magnet in said case, an energizeable electromagnet assembly adapted when energized to magnetically influence said magnet to rotate from one to the other of two predetermined limit positions, said electromagnet assembly positioned in said case and including first and second limit stops that determine said first and second limit positions respectively, a portion of said magnet having an electrically conductive surface, a pair of spaced electrically conductive contact members in said case in position to be engaged and bridged by said electrically conductive surface when said magnet is in one of said first and second limit positions, a pair of electrically conductive terminal members connected to said contact members for coupling said contact members to an electrical circuit, means in said case rotatable with said magnet for providing a first indication when said magnet is in said first limit position and a second indication when said magnet is in said second limit position, and means sealing off said open end of said case.